United States Patent
Boltze et al.

(10) Patent No.: US 7,335,129 B2
(45) Date of Patent: Feb. 26, 2008

(54) GEAR UNIT FITTING FOR A VEHICLE SEAT

(75) Inventors: Wolfgang Boltze, Kaiserslautern (DE); Thomas Dill, Heiligenmoschel (DE); Joachim Mühlberger, Obersülzen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 256 days.

(21) Appl. No.: 11/048,983

(22) Filed: Feb. 2, 2005

(65) Prior Publication Data

US 2005/0176553 A1   Aug. 11, 2005

(30) Foreign Application Priority Data

Feb. 6, 2004   (DE)   ............ 10 2004 005 980

(51) Int. Cl.
 *F16H 57/08* (2006.01)
 *B60N 2/30* (2006.01)

(52) U.S. Cl. ............... 475/341; 297/362

(58) Field of Classification Search ........ 475/162–3, 475/176–7, 341; 297/361, 362

See application file for complete search history.

(56) References Cited

U.S. PATENT DOCUMENTS 3,401,979 A * 9/1968 Putsch ............ 297/362
3,823,440 A * 7/1974 Klingelhofer ......... 16/325
4,668,013 A * 5/1987 Wahlmann ............ 297/362
5,188,571 A   2/1993 Boltze et al.
2002/0167210 A1* 11/2002 Dill .................. 297/362

FOREIGN PATENT DOCUMENTS

| DE | 29 18 252 A1 | 11/1980 |
| DE | 37 05 668 A1 | 9/1988 |
| DE | 40 34 843 C2 | 5/1992 |
| DE | 44 37 073 A1 | 1/1996 |
| GB | 2 049 027 A | 12/1980 |

* cited by examiner

*Primary Examiner*—Roger Pang
(74) *Attorney, Agent, or Firm*—Womble Carlyle Sandridge & Rice, PLLC

(57) ABSTRACT

In a gear unit fitting (1) for a vehicle seat, in particular for a motor vehicle seat, with a first ring wheel (13) to be mounted on a frame side, with a pinion (21) meshing with the first ring wheel (13), and with a second ring wheel (31) meshed with the pinion (21), on the output side, both the difference between the number of teeth ($z_2$) of the first ring wheel (13) and the number of teeth ($z_3$) of the pinion (21) on the frame side, and the difference between the number of teeth ($z_4$) of the second ring wheel (31) and the number of teeth ($z_3'$) of the pinion (21) on the output side, is in each case four.

19 Claims, 1 Drawing Sheet

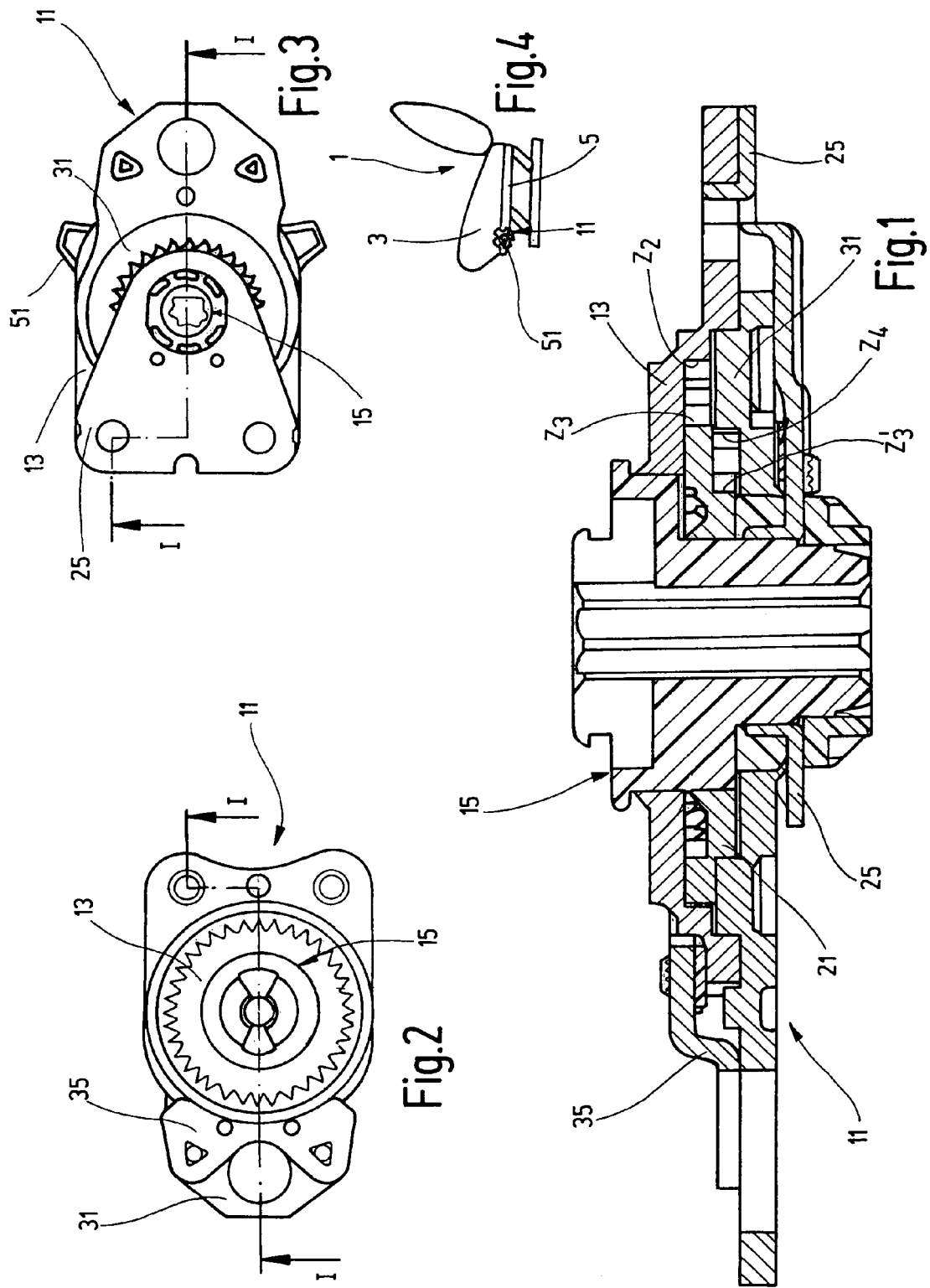

GEAR UNIT FITTING FOR A VEHICLE SEAT

CROSS-REFERENCE TO RELATED APPLICATION

The present application claims priority to DE 10 2004 005 980.2, which was filed Feb. 6, 2004, and is incorporated herein by reference in its entirety.

TECHNICAL FIELD

The present invention relates to a gear unit fitting for a vehicle seat and, more particularly, to a gear unit fitting for a motor vehicle seat, with the fitting including a first ring wheel on the frame side of the fitting, a pinion meshed with the first ring wheel, and a second ring wheel on the output side of the fitting and meshed with the pinion.

BACKGROUND OF THE INVENTION

DE 44 37 073 A1, which is incorporated herein by reference in its entirety, discloses a gear unit fitting that is of the type described in the Technical Field section above, and is intended for an adjustable vehicle seat. For DE 44 37 073 A1, the preferred number of teeth of the first ring wheel is 31, that of the pinion on the frame side is 30 and on the output side is 28, and that of the second ring wheel is 29. This results in a reduction of 435. For a reduction ratio close to practical requirements, along with a high blocking moment, high sequential reliability and minimum output play, there is still the need for optimization.

BRIEF SUMMARY OF SOME ASPECTS OF THE INVENTION

An aspect of the present invention is the provision of improvements to a gear unit fitting of the type described in the Technical Field section above, with the improvements including optimization of the number of teeth. In accordance with one aspect of the present invention, a gear unit fitting for a vehicle seat, in particular for a motor vehicle seat, includes a first ring wheel that is on a reference side (e.g., a frame side) of the gear unit fitting and includes a set of gear teeth, a second ring wheel that is on an output side of the gear unit fitting and includes a set of gear teeth, and a pivotably mounted pinion. The pinion includes a first set of gear teeth (e.g., on the frame side) that is at least partially meshed with the first ring wheel's set of gear teeth, and a second set of gear teeth (e.g., on the output side) that is at least partially meshed with the second ring wheel's set of gear teeth, so that pivoting of the pinion causes relative pivoting about an axis between the frame side of the gear unit fitting and the output side of the gear unit fitting. Regarding the number of teeth and in accordance with the present aspect, the difference between the number of teeth in the first ring wheel's set of gear teeth and the number of teeth in the pinion's first set of gear teeth is four, and likewise, the difference between the number of teeth in the second ring wheel's set of gear teeth and the number of teeth in the pinion's second set of gear teeth is four.

Since the difference between the number of teeth of the first ring wheel and the number of teeth of the pinion on the frame side, and the difference between the number of teeth of the second ring wheel and the number of teeth of the pinion on the output side is in each case four, this results, in the case of a self-locking gear unit fitting with a reduction ratio of 30 to 35, not only in minimum play, but also in a high sequential reliability and maximum involute overlap, along with a minimum operational pressure angle and high strength. Different ranges in the numbers of teeth, for example a number of teeth of the first ring wheel in the range of between 29 and 40 and/or a number of teeth of the second ring wheel in the range of between 24 and 31 and/or a difference in the number of teeth on the pinion in the range of five to nine, are advantageous in this case.

With a view to efficient and easy production by stamping and in terms of the construction space usually available, in an especially preferred version the number of teeth of the first ring wheel is 36, the number of teeth of the pinion on the frame side is 32, the number of teeth of the pinion on the output side is 25 and the number of teeth of the second ring wheel is 29. Although this version is especially preferred, it should nonetheless be considered as a nonlimiting example because the details of this especially preferred version are not essential and other versions are also within the scope of the present invention.

For efficiently driving the gear unit fitting, a rotatable driver can be provided. The rotatable driver is mounted, for example, in the first ring wheel and drives the pinion by means of an eccentric portion. The pinion and the largest part of the driver are in this case preferably seated in a construction space surrounded and closed by the two ring wheels, holding clip(s) ensuring axial retention. The driver can be rotated, for example, by means of a profiled rod which passes through it and is itself rotated manually by a handwheel or the like, or by a motor.

The gear unit fitting according to the invention can be used in many different ways, for example for setting the inclination of the seat cushion, the backrest or a thigh support of a vehicle seat or for any other setting of part of the vehicle seat.

Other aspects and advantages of the present invention will become apparent from the following.

BRIEF DESCRIPTION OF THE DRAWINGS

The invention is explained in more detail below with reference to an exemplary embodiment illustrated in the drawings in which:

FIG. 1 shows a longitudinal section through the exemplary embodiment along the lines I-I in FIGS. 2 and 3, with the handwheel being omitted, FIG. 2 shows a side view of the exemplary embodiment without the handwheel, FIG. 3 shows a side view from the viewing direction opposite to that of FIG. 2, with a majority of the handwheel being hidden from view, and FIG. 4 shows a diagrammatic illustration of a vehicle seat.

DETAILED DESCRIPTION OF THE INVENTION

In the following, reference is made in greater detail to the drawings, in which like numerals refer to like parts throughout the several views. In a vehicle seat 1, in particular a motor vehicle seat, to adjust the inclination of the seat cushion 3, a pivotable joint is provided at the front end of a side part 5 of the seat frame on one side of the vehicle seat, and a manually drivable self-locking gear unit fitting 11 is provided at the front end of the side part 5 of the seat frame that is located on the other side of the vehicle seat. For a gear unit fitting 11 that is fully installed to a vehicle seat 1, the side of the gear unit fitting 11 which remains stationary during adjustment is designated as the frame side (e.g., reference side), while the moved side of the gear unit fitting 11 is designated as the output side.

Those of ordinary skill in the art will understand how to adjust a seat cushion's inclination using a pivotable joint at the front end of a side part of a seat frame on one side of the vehicle seat, and a gear unit fitting at the front end of the side part of the seat frame that is located on the other side of the vehicle seat. In this regard and for example, and not for the purpose of limiting the scope of the present invention, each of U.S. Pat. Nos. 6,460,819, 6,550,863 and 6,715,832, and U.S. Application Pub. No. 2003/0042778 are incorporated herein by reference, in their entirety. Notwithstanding the foregoing, the gear unit fitting 11 can also be used for adjusting the inclination or other orientations of other parts of the vehicle seat 1, for example for adjusting the inclination of the vehicle seat's backrest.

The gear unit fitting 11 is provided with a first ring wheel 13 which is fastened on the frame side the gear unit fitting 11. The internal toothing of the first ring wheel 13 has a number of teeth z2. That is, in the gear unit fitting 11 of the exemplary embodiment, the first ring wheel 13 includes a set of gear teeth, and with respect to number of teeth, the set of gear teeth of the first ring wheel 13 consists solely of the number of teeth z2. In a central orifice of the frame-side ring wheel 13, a driver 15 is rotatably mounted. The axis of rotation of the driver 15 defines the cylinder coordinate system used below. A pinion 21, which serves as a planet wheel, is mounted slideably on an eccentric portion of the driver 15.

The pinion 21 has two external toothings (i.e., two sets of external gear teeth) one behind the other in the axial direction, and in the exemplary embodiment these two external toothings have different tip and root diameters. That is, the pinion 21 is of stepped design. The pinion's external toothing that faces the first ring wheel 13 and meshes with the internal toothing of the first ring wheel 13 has the number of teeth z3. That is, in the gear unit fitting 11 of the exemplary embodiment, the pinion 21 includes a set of gear teeth that faces the first ring wheel 13 and meshes with the internal toothing of the first ring wheel 13, and with respect to number of teeth, this set of gear teeth of the pinion 21 consists solely of the number of teeth z3.

The pinion's external toothing facing a second ring wheel 31 has the number of teeth z3'. That is, in the gear unit fitting 11 of the exemplary embodiment, the pinion 21 includes a set of gear teeth that faces the second ring wheel 31, and with respect to number of teeth, this set of gear teeth of the pinion 21 consists solely of the number of teeth z3'. The pinion's external toothing that faces the second ring wheel 31 meshes with an internal toothing of the second ring wheel 31. The second ring wheel 31 is arranged on the output side the gear unit fitting 11. The second ring wheel 31 is mounted in the first ring wheel 13 and has a number of teeth z4. That is, the second ring wheel 31 includes a set of gear teeth, and with respect to number of teeth, the set of gear teeth of the second ring wheel 31 consists solely of the number of teeth z4.

Two holding clips 25 and 35, which are in each case attached to one of the ring wheels 13 or 31, ensure a mutual axial retention of the two ring wheels 13 and 31 and consequently of the entire gear unit fitting 11. To drive the gear unit fitting 11 by way of the driver 15, a manually rotatable handwheel 51 is provided. The handwheel 51 is seated on a transmission rod profiled by means of longitudinal ribs and pushed positively into the driver 15.

Taking into account a suitable interval for the rotational transmission of about 30 to 35 (reduction ratio), a minimum play on the output side on account of a vanishing difference in the number of teeth, that is to say $(z2-z3)-(z4-z3')=0$, which would otherwise have to be compensated by means of profile displacement, the self-locking condition, and a maximum involute overlap with a minimum operational pressure angle and after a balance between self-locking and sequential reliability, on the one hand, and involute overlap and strength on the other hand (the blocking moment should be higher than 400 Nm), the numbers of teeth are selected from one of the following combinations with $(z2-z3)=4$ and $(z4-z3')=4$:

| z2 | z3 | z3' | z4 |
|----|----|-----|-----|
| 40 | 36 | 27 | 31 |
| 39 | 35 | 27 | 31 |
| 38 | 34 | 26 | 30 |
| 36 | 32 | 25 | 29 |
| 35 | 31 | 24 | 28 |
| 34 | 30 | 24 | 28 |
| 33 | 29 | 23 | 27 |
| 32 | 28 | 22 | 26 |
| 30 | 26 | 21 | 25 |
| 29 | 25 | 20 | 24 |

Taking into account the available construction space having a diameter of about 50 mm and the outlay in terms of production by stamping, the combination z2=36, z3=32, z3'=25 and z4=29 is preferred, although this preferred combination can be characterized as being optional in that other combinations are also within the scope of the present invention.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. A gear unit fitting for a vehicle seat, the gear unit fitting comprising:
    a first ring wheel on a reference side of the gear unit fitting and including a set of gear teeth;
    a second ring wheel on an output side of the gear unit fitting and including a set of gear teeth; and
    a pivotably mounted pinion including a first set of gear teeth and a second set of gear teeth, wherein the pinion's first set of gear teeth is at least partially meshed with the first ring wheel's set of gear teeth, and the pinion's second set of gear teeth is at least partially meshed with the second ring wheel's set of gear teeth, so that pivoting of the pinion can cause relative pivoting about an axis between the reference side of the gear unit fitting and the output side of the gear unit fitting, and wherein
    (a) the difference between the number of teeth in the first ring wheel's set of gear teeth and the number of teeth in the pinion's first set of gear teeth is equal to four, and
    (b) the difference between the number of teeth in the second ring wheel's set of gear teeth and the number of teeth in the pinion's second set of gear teeth is equal to four.

2. The gear unit fitting according to claim 1, wherein the number of teeth in the first ring wheel's set of gear teeth is in a range from twenty-nine to forty, with the range from twenty-nine to forty including both twenty-nine and forty.

3. The gear unit fitting according to claim 2, wherein the number of teeth in the second ring wheel's set of gear teeth is in a range from twenty-four to thirty-one, with the range from twenty-four to thirty-one including both twenty-four and thirty-one.

4. The gear unit fitting according to claim 1, wherein the difference between the number of teeth in the pinion's first set of gear teeth and the number of teeth in the pinion's second set of gear teeth is in a range from five to nine, with the range from five to nine including both five and nine.

5. The gear unit fitting according to claim 1, wherein:
the number of teeth in the first ring wheel's set of gear teeth is thirty-six,
the number of teeth in the pinion's first set of gear teeth is thirty-two,
the number of teeth in the pinion's second set of gear teeth is twenty-five, and
the number of teeth in the second ring wheel's set of gear teeth is twenty-nine.

6. The gear unit fitting according to claim 1, further comprising a rotatable driver for driving the pinion by way of an eccentric portion.

7. The gear unit fitting according to claim 6, wherein the driver can be rotated manually or by a motor.

8. The gear unit fitting according to claim 1, wherein the gear unit fitting is self-locking.

9. The gear unit fitting according to claim 1, further comprising at least one holding clip for at least partially restricting any movement of the first ring wheel and second ring wheel away from each other in a direction parallel to the axis, so that the pinion is retained in a position between the first ring wheel and second ring wheel.

10. The gear unit fitting according to claim 1 in combination with the vehicle seat, wherein the gear unit fitting is operative for adjusting an inclination of a part of the vehicle seat.

11. The gear unit fitting according to claim 2, wherein the difference between the number of teeth in the pinion's first set of gear teeth and the number of teeth in the pinion's second set of gear teeth is in a range from five to nine, with the range from five to nine including both five and nine.

12. The gear unit fitting according to claim 3, wherein the difference between the number of teeth in the pinion's first set of gear teeth and the number of teeth in the pinion's second set of gear teeth is in a range from five to nine, with the range from five to nine including both five and nine.

13. The gear unit fitting according to claim 2, further comprising a rotatable driver for driving the pinion by way of an eccentric portion.

14. The gear unit fitting according to claim 3, further comprising a rotatable driver for driving the pinion by way of an eccentric portion.

15. The gear unit fitting according to claim 4, further comprising a rotatable driver for driving the pinion by way of an eccentric portion.

16. The gear unit fitting according to claim 1, further comprising holding clips respectively on the first and second ring wheels for at least partially restricting any movement of the first ring wheel and second ring wheel away from each other in a direction parallel to the axis, so that the pinion is retained in a position between the first ring wheel and second ring wheel.

17. The gear unit fitting according to claim 2 further comprising at least one holding clip for at least partially restricting any movement of the first ring wheel and second ring wheel away from each other in a direction parallel to the axis, so that the pinion is retained in a position between the first ring wheel and second ring wheel.

18. The gear unit fitting according to claim 3, further comprising at least one holding clip for at least partially restricting any movement of the first ring wheel and second ring wheel away from each other in a direction parallel to the axis, so that the pinion is retained in a position between the first ring wheel and second ring wheel.

19. The gear unit fitting according to claim 5, further comprising a rotatable driver for driving the pinion by way of an eccentric portion.

* * * * *